No. 748,709. Patented January 5, 1904.

UNITED STATES PATENT OFFICE.

HENRY V. DUNHAM, OF NEW YORK, N. Y., ASSIGNOR TO CASEIN COMPANY OF AMERICA, A CORPORATION OF NEW JERSEY.

CASEIN-CELLULOSE COMPOSITION AND PROCESS OF PRODUCING SAME.

SPECIFICATION forming part of Letters Patent No. 748,709, dated January 5, 1904.

Application filed May 20, 1903. Serial No. 158,046. (No specimens.)

*To all whom it may concern:*

Be it known that I, HENRY V. DUNHAM, a citizen of the United States, residing at New York, in the county of New York and State of New York, have invented or discovered certain new and useful Improvements in Casein-Cellulose Compositions and Processes of Producing Same, of which the following is a specification.

Some experiments have heretofore been made with a view of producing a composition of matter consisting largely of casein and nitrocellulose and which, while having the properties and characteristics of celluloid, would be produced at a lesser cost. In thus attempting to produce the celluloid-like products comprising casein many difficulties have been experienced in securing a homogeneous product, owing to the fact that different solvents have been required for the casein and the nitrocellulose, and in order to form a homogeneous compound comprising these different ingredients slow and more or less complicated processes have been required as well as somewhat expensive solvents for the mixed ingredients after the same had been separately reduced to plastic or viscous conditions by their separate solvents.

This invention or discovery has for its object to provide a celluloid-like product of a homogeneous character and by a comparatively inexpensive and rapid process and the cost of which product will be very much less than the cost of celluloid, while the product itself will be practically just as good as celluloid in that it will be hard and somewhat elastic or flexible without being brittle, will be impermeable to water, so as not to be softened thereby, and will be capable of being sawed, turned, or carved or otherwise treated like celluloid in the production of various articles. In conducting experiments to secure these results a common solvent—to wit, glaciacetic acid—has been discovered for the casein and nitrocellulose, so that by the use of this acid these two substances can both be dissolved, and thus combined into a homogeneous product without the use of the expensive solvents and processes required in the past for making a homogeneous celluloid-like compound comprising casein and nitrocellulose.

One important feature of this discovery that casein is soluble in glaciacetic acid is the fact that a casein solution produced by this acid does not affect the chemical or physical character of the nitrocellulose or of the other ingredients usually employed in the manufacture of celluloid when the glaciacetic-acid solution of casein is mixed with the solution of nitrocellulose, camphor, and the other ingredients usually employed in the manufacture of celluloid, whether the nitrocellulose solution has been produced by glaciacetic acid or by any other proper solvent therefor. Owing to this feature of the discovery, the process of combining casein with nitrocellulose and the other ingredients usually employed in the manufacture of celluloid is greatly simplified over what has been required in the past, where the casein has been dissolved with alkaline solvents and which alkaline casein solvents have required comparatively slow and expensive processes of treatment to bring them into a condition to be combined with nitrocellulose in a homogeneous compound.

In practicing the invention or discovery the nitrocellulose may, as above suggested, be dissolved in any suitable manner heretofore practiced, either by glaciacetic acid or any other proper solvents. To dissolve ordinary commercial casein for the celluloid-like composition either in a dry or wet condition, about equal parts of the casein and glaciacetic acid are mixed together, and the mixture is then preferably gently heated over a water-bath or in a jacket-kettle to obtain a perfect solution of the casein, which will be effected in about twenty minutes, and the casein solution thus obtained will be comparatively clear and transparent. This casein solution can then be added directly to the solution of nitrocellulose and the other ingredients usually employed in the manufacture of celluloid either with or without being diluted with alcohol or other substances not affecting the chemical or physical character of the casein and other ingredients of the celluloid-like product in a proportion of, say, about one hundred parts of the casein solution to two hundred parts of the nitrocellulose solution, and the whole mixture will then be stirred or agitated in any suitable manner and quickly combined into a homogeneous product or mass which can be worked by any of the usual methods or machines employed in the manufacture of celluloid.

The invention or discovery is, however, not to be understood as being limited to the above-mentioned proportions of casein and nitrocellulose, as, while a mixture of one hundred parts of the casein solution to two hundred parts of the nitrocellulose solution will give a product not inferior to ordinary celluloid, but considerably cheaper, still cheaper celluloid products may be made by using larger percentages of casein and smaller percentages of nitrocellulose. Also instead of dissolving the casein and nitrocellulose separately, as hereinbefore suggested, these ingredients may be mixed together in the desired proportions and the mixture then be dissolved by the glaciacetic acid, owing to the fact that this acid is a common solvent for both substances. Also the invention or discovery is not to be understood as being limited to the use of glaciacetic acid, as any other equivalent acid or acid salt which will dissolve both the casein and nitrocellulose will be included by the invention or discovery.

Having thus described my invention or discovery, I claim and desire to secure by Letters Patent—

1. The herein-described celluloid-like product, of a homogeneous character, comprising nitrocellulose, casein, and a common solvent for these two ingredients.

2. The herein-described celluloid-like product, of a homogeneous character, comprising nitrocellulose and a solution of casein with glaciacetic acid.

3. The herein-described celluloid-like product, of a homogeneous character, comprising nitrocellulose, casein and glaciacetic acid.

4. The herein-described steps in the process for producing a celluloid-like product, consisting in dissolving both nitrocellulose and casein with a common solvent and thoroughly mixing the said ingredients together until the mixture is of a homogeneous character.

5. The herein-described process for producing a celluloid-like product, consisting in dissolving casein with glaciacetic acid and then thoroughly mixing the said casein solution with nitrocellulose and other ingredients usually employed in the manufacture of celluloid.

6. The herein-described process for producing a celluloid-like product, consisting in dissolving both casein and nitrocellulose with glaciacetic acid, and then thoroughly mixing the said dissolved ingredients and other usual ingredients of celluloid together to form a homogeneous composition.

In testimony whereof I affix my signature in presence of two witnesses.

HENRY V. DUNHAM.

Witnesses:
S. LISTOE,
JOHANNES D. FÜHRING.